(12) United States Patent
Wei

(10) Patent No.: US 9,167,939 B2
(45) Date of Patent: Oct. 27, 2015

(54) SHOWER DOOR ASSEMBLY

(71) Applicant: FOSHAN IDEAL CO., LTD., Foshan, Guangdong (CN)

(72) Inventor: Wuxiang Wei, Guangdong (CN)

(73) Assignee: Foshan Ideal Co., Ltd., Guangdong (CN)

( * ) Notice: Subject to any disclaimer, the term of this patent is extended or adjusted under 35 U.S.C. 154(b) by 0 days.

(21) Appl. No.: 13/861,081

(22) Filed: Apr. 11, 2013

(65) Prior Publication Data

US 2014/0250795 A1   Sep. 11, 2014

(30) Foreign Application Priority Data

Mar. 5, 2013   (CN) ..................... 2013 2 0099173 U

(51) Int. Cl.
*A47K 3/36* (2006.01)
*E06B 1/60* (2006.01)
*A47K 3/30* (2006.01)
*F16B 2/18* (2006.01)
*F16B 7/04* (2006.01)
*E06B 3/72* (2006.01)
*E06B 3/964* (2006.01)

(52) U.S. Cl.
CPC ... *A47K 3/36* (2013.01); *A47K 3/30* (2013.01); *E06B 1/6023* (2013.01); *E06B 3/72* (2013.01); *E06B 3/964* (2013.01); *F16B 2/185* (2013.01); *F16B 7/0473* (2013.01); *A47K 2003/307* (2013.01)

(58) Field of Classification Search
CPC ........... E06B 1/02; E06B 1/04; E06B 1/6023; E06B 1/603; E06B 1/6046
USPC ............... 49/504, 505; 4/607, 610; 52/656.9, 52/127.11, 582.2
See application file for complete search history.

(56) References Cited

U.S. PATENT DOCUMENTS

| 3,111,208 | A | * | 11/1963 | Grossman | ....................... 49/396 |
| 3,438,344 | A | * | 4/1969 | Ferdinand et al. | ............ 108/110 |
| 3,654,879 | A | * | 4/1972 | Ferdinand et al. | ............ 108/110 |
| 4,942,713 | A | * | 7/1990 | Jackson | ....................... 52/481.2 |
| 8,413,401 | B2 | * | 4/2013 | Wang | ........................... 52/656.9 |
| 2012/0279166 | A1 | * | 11/2012 | Valler et al. | .................. 52/656.2 |
| 2014/0068853 | A1 | * | 3/2014 | Opwald | ............................ 4/607 |

* cited by examiner

*Primary Examiner* — Katherine Mitchell
*Assistant Examiner* — Catherine A Kelly
(74) *Attorney, Agent, or Firm* — Nixon Peabody LLP; Jeffrey L. Costellia

(57) ABSTRACT

A shower door assembly is disclosed comprising a stationary frame, a movable frame having a window, an upper frame, and an adjusting assembly. The adjusting assembly further comprises an adjusting block and a fixing block. The adjusting block is disposed between the stationary frame and the movable frame and at least partially received in the stationary frame, and the adjusting block further includes an extension portion on a surface of which a first engaging element is disposed. The fixing block is received in the upper frame and includes an eccentric rotary block having a second engaging element and a base portion having a passage for receiving the extension portion. The eccentric rotary block is rotatable about the base portion.

9 Claims, 9 Drawing Sheets

SHOWER DOOR ASSEMBLY

CROSS-REFERENCE TO RELATED APPLICATION

The present invention claims priority benefits from Chinese utility model application No. 201320099173.4 filed on Mar. 5, 2013, the disclosure of which is hereby incorporated herein by reference.

FIELD OF THE INVENTION

The present invention relates to a shower door assembly and, in particular to a structure for installing and adjusting a stationary frame and a movable frame of the shower door.

BACKGROUND OF THE INVENTION

Conventionally, shower doors are always installed by drilling on the stationary frame and movable frames and then using screws to fix them to a wall surface. However, the installation process is very inconvenient to operators and time-consuming. Moreover, the drilling may cause damages or scares to surfaces of the frames made of, for example, aluminum or its alloys, and in extreme cases, the drilling may cause the shower doors destroyed.

SUMMARY OF THE INVENTION

One object of the present invention is to provide a shower door assembly with simple structure which is convenient and quick to install without drilling holes in the installation process.

To achieve the object, a shower door assembly is provided which comprises a stationary frame, a movable frame having a window, an upper frame, and an adjusting assembly. The adjusting assembly further comprises an adjusting block and a fixing block. The adjusting block is disposed between the stationary frame and the movable frame and at least partially received in the stationary frame, and the adjusting block further includes an extension portion on a surface of which a first engaging element is disposed. The fixing block is received in the upper frame and includes an eccentric rotary block having a second engaging element and a base portion having a passage for receiving the extension portion. The eccentric rotary block is rotatable about the base portion.

In one embodiment, the upper frame has an opening in which the fixing block is at least partially embedded. Preferably, the upper frame has a sliding groove and correspondingly the fixing block has a sliding rail such that the fixing block can slide into the upper frame along the sliding groove and is received in the upper frame.

In one embodiment, the movable frame has a through hole and the upper frame has at least one corresponding screw hole such that the upper frame, the fixing block and the movable frame is installed together by a fastener through the screw hole and the through hole.

In one embodiment, the eccentric rotary block comprises a push portion and a handle perpendicular to the push portion, and the second engaging element is disposed on an outer surface of the push portion. Preferably, the second engaging element is disposed on a surface of the push portion adjacent to the handle. In one embodiment, a gap is formed at an end of the handle remote from the push portion.

In one embodiment, the base portion includes a concave for receiving the eccentric rotary block. In one embodiment, a first pinhole is disposed on a wall of the concave and correspondingly a second pinhole is disposed on the push portion of the eccentric rotary block, the eccentric rotary block being rotatable about the base portion by a pin.

In one embodiment, the stationary frame has a guiding groove and the adjusting block has a flange such that the adjusting block can be received in the stationary frame. In a further embodiment, the adjusting block comprises an adjusting portion having the extension portion and a baffle, and a fixing portion having a base, a lateral wall projecting vertically from the base and an elastic member connected to the lateral wall, and an open chamber is formed between the elastic member and the base, wherein the baffle can be inserted into the chamber as the elastic member is pressed by the baffle such that the fixing portion and the adjusting portion are coupled with each other.

The shower door assembly according to the present invention has simple structures and is convenient and quick to install without drilling holes in the installation process. Meanwhile, the present invention can assure a satisfying appearance and quality of the products because there is no need to drill holes on the surface of the frames made of, for example, aluminum.

BRIEF DESCRIPTION OF THE DRAWINGS

Further advantages and details of the present invention emerge from the example embodiments described below, which do not limit the invention in any way, and from the drawings, in which.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

Example 1

Figure 1:
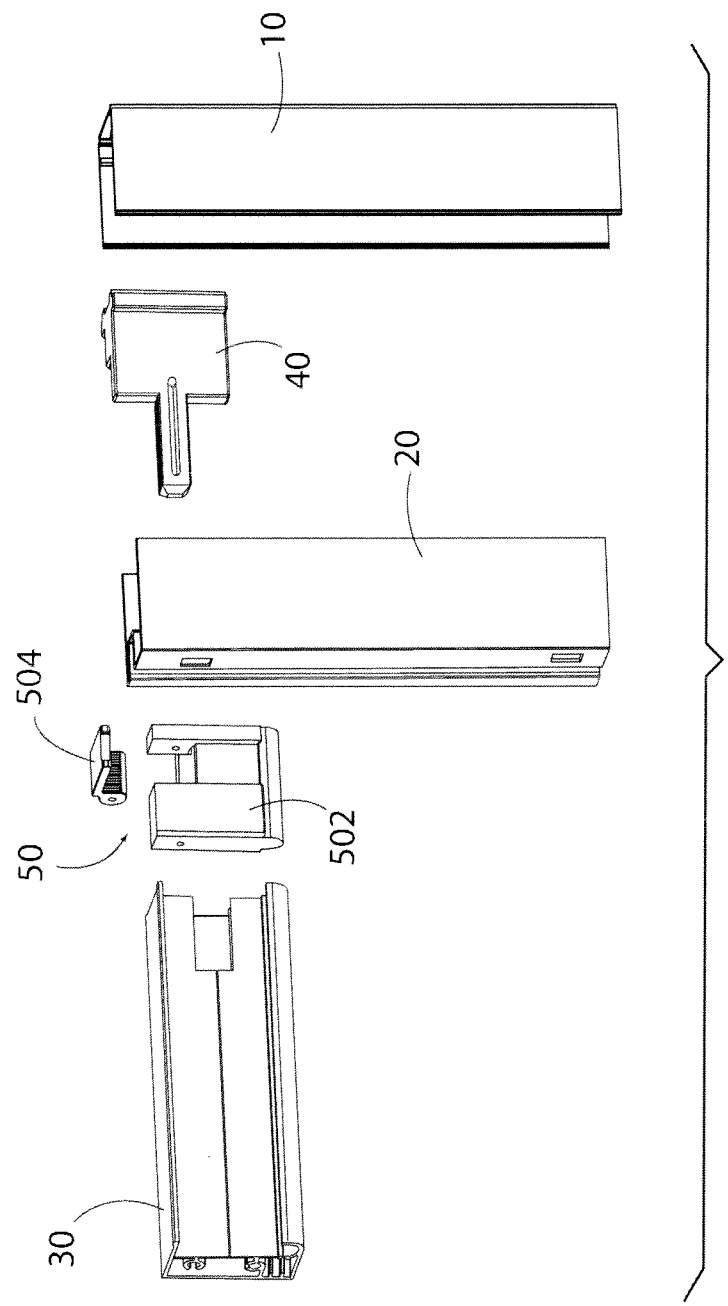
FIG. 1 shows the primary components of an exemplary shower door according the present invention and the spatial relationships of the same.

Referring to FIG. 1, an exemplary shower door assembly primarily comprises a stationary frame 10, a movable frame 20, an upper frame 30, a glass door (not shown) and an adjusting assembly. The assembly primarily includes an adjusting block 40 and a fixing block 50 having a base portion 502 and an eccentric rotary block 504.

Figure 2:
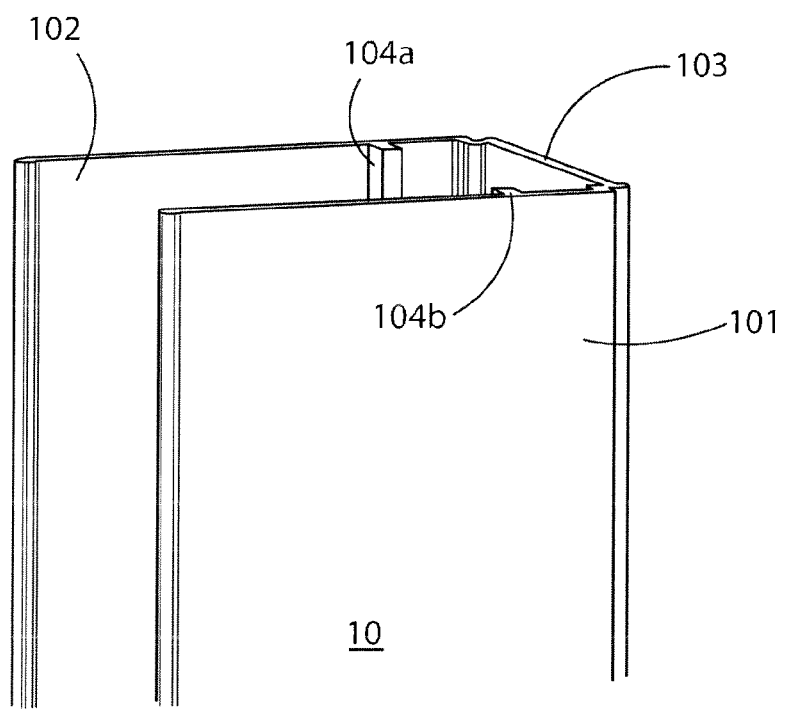
FIG. 2 is a partially detailed view of an exemplary stationary frame.

Specifically, referring to FIG. 2, the stationary frame 10 includes two transverse plates and a lateral plate 103 which form a space together for receiving the adjusting block 40. Baffles 104a, 104b which are opposite to one another extend respectively from the two transverse plates toward the space to form a guiding groove with the lateral plate 103 together. The stationary frame 10 can be fixing to a wall in a suitable manner. In this example, the stationary frame 10 is fixed to the wall by a fastener through a screw hole (not shown) disposed in the stationary frame 10. It is possible to fix the stationary frame to the wall in other manners, for example, using adhesive agents.

Figure 4:
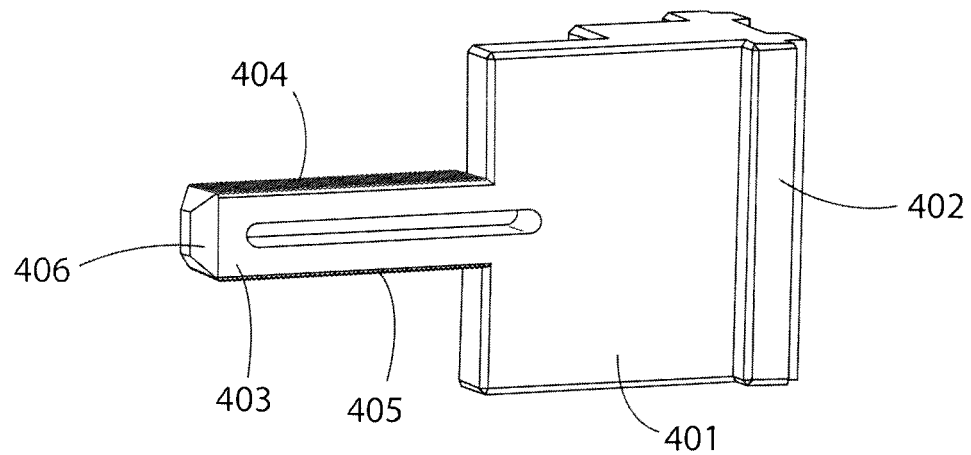
FIG. 4 is a structural view of an exemplary adjusting block of the adjusting assembly.

Referring to FIG. 4, the adjusting block 40 comprises a main body 401 and an extension portion 403. The main body 401 has a flange 402 for inserting into the guiding groove of the stationary frame 10 to connect the adjusting block 40 with the stationary frame 10 detachably. The extension portion 403 is substantially perpendicular to the main body 401 and has teeth 404 disposed on an upper surface of the extension portion 403. Preferably, teeth 405 are also disposed on a lower surface of the extension portion 403 for improving the locking effect, while it is enough for achieving the object of the present invention to dispose the teeth 404 only on the upper surface. In this example, a chamfering edge 406 is provided at an end of the extension portion 403 remote from the main body 401 to facilitate insertion of the extension portion 403 into a passage 63 of the fixing block 50 which will be described in detail below.

Figure 3:
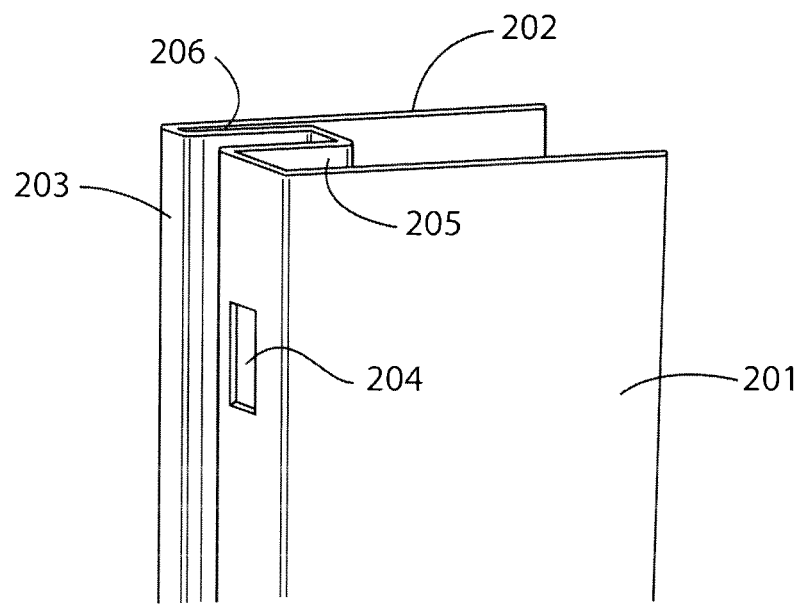
FIG. 3 is a partially detailed view of an exemplary movable frame.

Referring to FIG. 3 which is a partially detailed view of the movable frame 20, the movable frame 20 is consisted of two transverse plates 201, 202 and a lateral plate 203 having a window 204. The extension portion 403 of the adjusting block 40 goes through the window 204. In this example, the lateral plate 203 has only one window 204. The lateral plate 203 may have more windows as more adjusting blocks are needed for use, for example, two adjusting blocks respectively disposed on the top and bottom of the stationary frame. A portion of the lateral wall 203 projects inwards to form a space 205 for receiving the transverse plate 101 of the stationary frame and the extension portion 403, and a space 206 for receiving the transverse plate 102 of the stationary frame. In a further embodiment, two transverse plates of the stationary frame may be disposed at the outsides of the transverse plates of the movable frame, i.e., two transverse plates of the movable frame are surrounded by the transverse plates of the stationary frame.

Referring to FIG. 6 showing different perspective views of the eccentric rotary block 504 of the fixing block 50, the eccentric rotary block 504 includes a handle 71 and a push portion 72. The push portion 72 is substantially in a shape of cylinder and the handle 71 is arranged in the tangential direction of the push portion. Teeth 73 which are coupled with teeth 404 in close state are disposed on a surface of the push portion 72. In this example, the surface on which the teeth 73 are disposed is not curved but flat, which will facilitate a tight engagement of the teeth 404 with the teeth 73. Preferably, the teeth 73 are disposed on a surface of the push portion 72 adjacent to the handle 71.

Figure 5A:
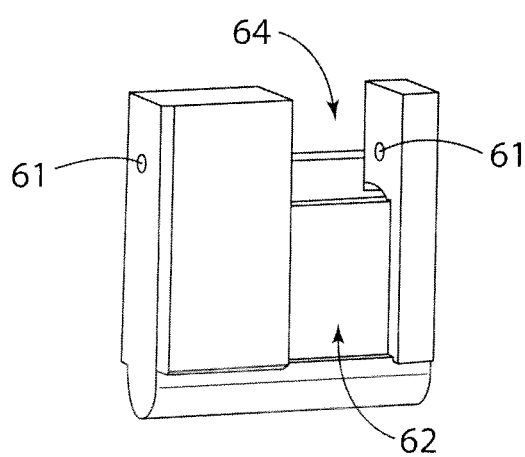
FIGS. 5A and 5B respectively show different perspective views of a base portion of an exemplary fixing block.
Figure 5B:
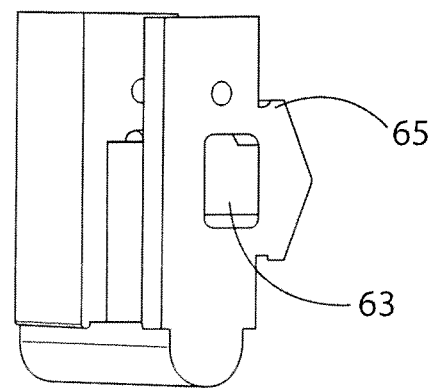

FIGS. 5A and 5B respectively show different perspective views of the base portion 502 of the fixing block 50. The base portion 502 includes concaves 62 and 64, the passage 63 and a sliding rail 65. The concave 64 is arranged to receive the push portion 72 of the eccentric rotary block 504, whereas the concave 62 is arranged to receive the handle 71. Pinholes 61 are provided in two walls of the concave 64 opposite to one another, and a pinhole 75 is provided in the push portion 72. The base portion 502 and the eccentric rotary block 504 are connected together by a pin (not shown) through the pinholes 61, 75 such that the eccentric rotary block 504 can be rotated about the pin in a space of the concave 62, 64. The passage 63 for receiving the extension portion 403 goes through the base portion 502 in the direction of the extension portion 403. In this example, the passage 63 has a length of about 5 cm to 20 cm. It is possible for a skilled person to adjust the inner diameter and length of the passage. The passage preferably has a cross-section matching to that of the extension portion.

Figure 7A:
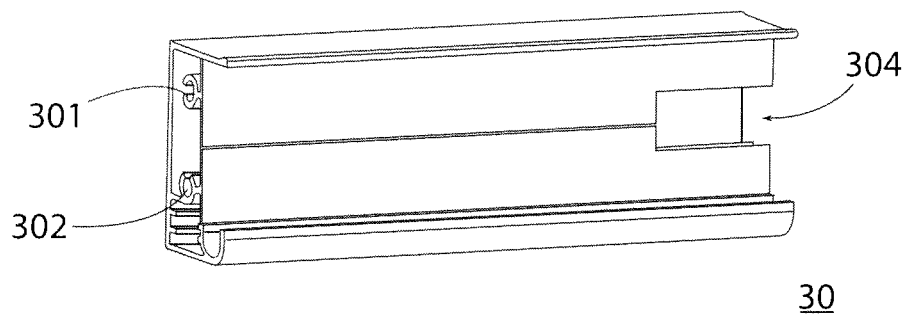
FIGS. 7A and 7B respectively show different perspective views of an exemplary upper frame.
Figure 7B:
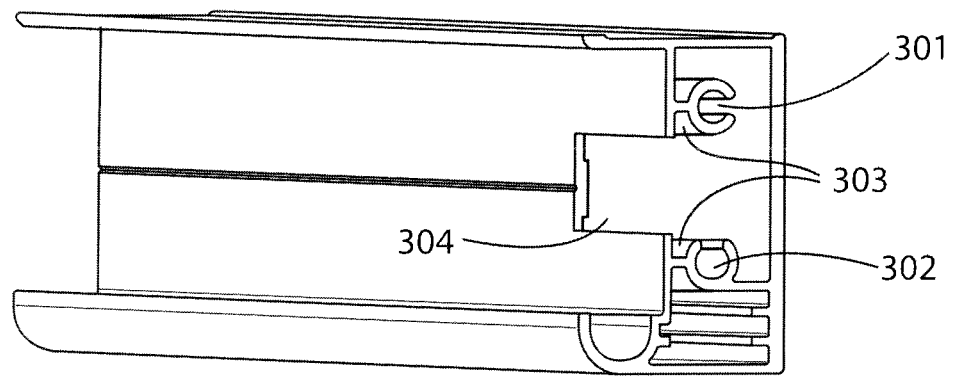

Referring to FIG. 7, the upper frame 30 has a sliding groove 303 and an opening 304. The sliding groove 303 is arranged to couple with the sliding rail 65 of the base portion 502 such that the fixing block 50 can be connected to the upper frame 30. The opening 304 is arranged to receive a portion of the base portion 502 and prevent the fixing block 50 from free sliding in the upper frame. In this example, the upper frame 30 further has two screw holes 301 and 302 such that the movable frame 20, the fixing block 50 and the upper frame 30 can be connected together by fasteners (for example, screws) through the screw holes 301 and 302.

Figure 6A:
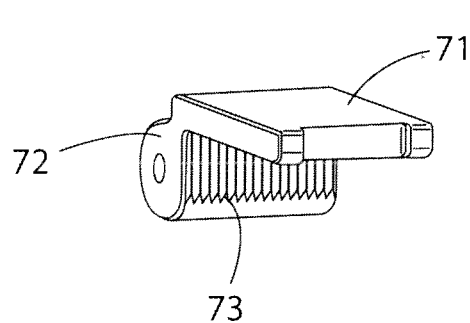
FIGS. 6A and 6B respectively show different perspective views of an eccentric rotary block of an exemplary fixing block.
Figure 6B:
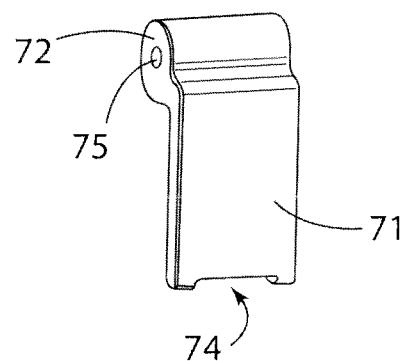
Figure 8:
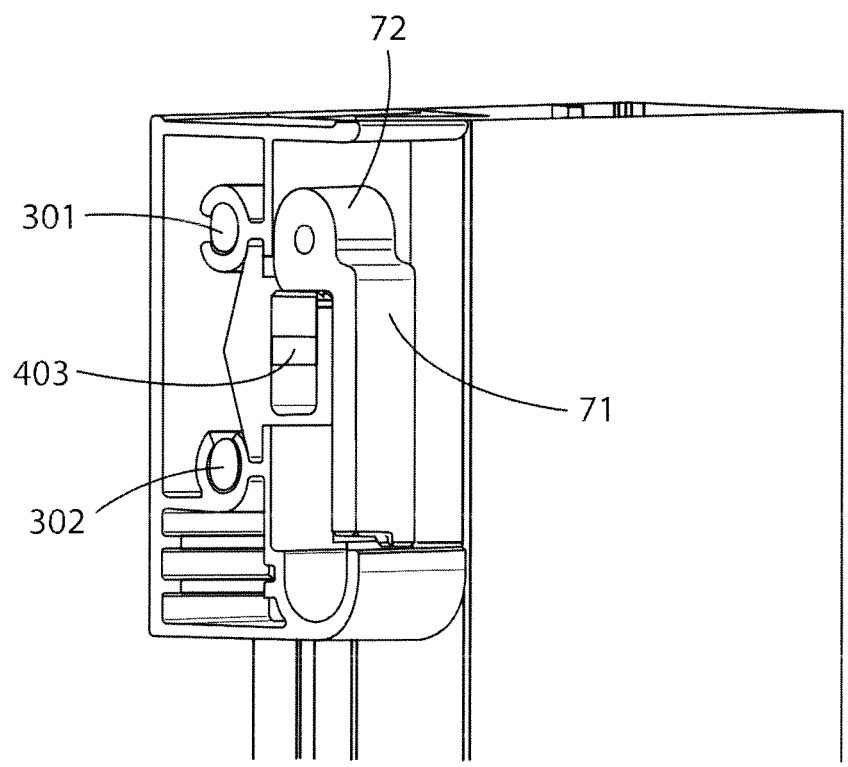
FIG. 8 shows a partially sectional view of the adjusting assembly as being locked.
Figure 9:
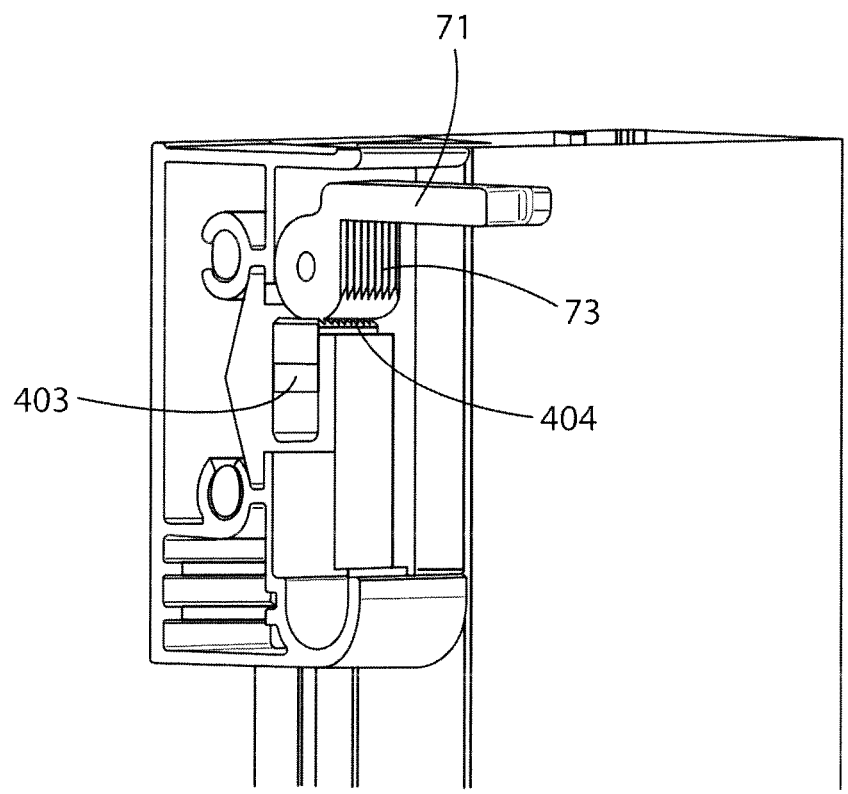
FIG. 9 shows a partially sectional view of the adjusting assembly as being opened.

Referring to FIG. 8, the eccentric rotary block 504 is in close state when the handle 71 is in a position as shown in FIG. 6(B), i.e., the handle is perpendicular to a plane where the teeth 404 reside. Referring to FIG. 9, the eccentric rotary block 504 is in open state when the handle 71 is in a position as shown in FIG. 6(A), i.e., the handle is parallel to a plane where the teeth 404 reside.

In this example, a gap 74 is formed at an end of the handle 71 remote from the push portion 72. When the eccentric rotary block 504 is in the close state, a force can be applied to the handle 71 by a tool (a flat screwdriver, for example) which is inserted into the gap 74 to make the handle 71 move upwards, and ultimately make it rotate to an open position.

During the installation process, the adjusting block 40 is installed to the stationary frame 10 after the stationary frame 10 is fixed to the wall, and subsequently, the movable frame 20, the fixing block 50 and the upper frame 30 are connected together. The relative positions of the stationary frame 10 and the movable frame 20 are adjusted to allow the extension portion 403 go through the window 204 of the movable frame 20 to insert into the passage 63. When all components are in desired positions, the handle 71 is rotated downwards and a force is applied to the extension portion by the push portion 72 such that the teeth 73 are engaged with the teeth 404 and thus the extension portion 403 is restricted in the passage 63 without relative motion between the movable frame 20 and the stationary frame 10. The handle 71 can be rotated upwards to allow the extension portion 403 exit from the passage 63 as required.

Example 2

Figure 10:
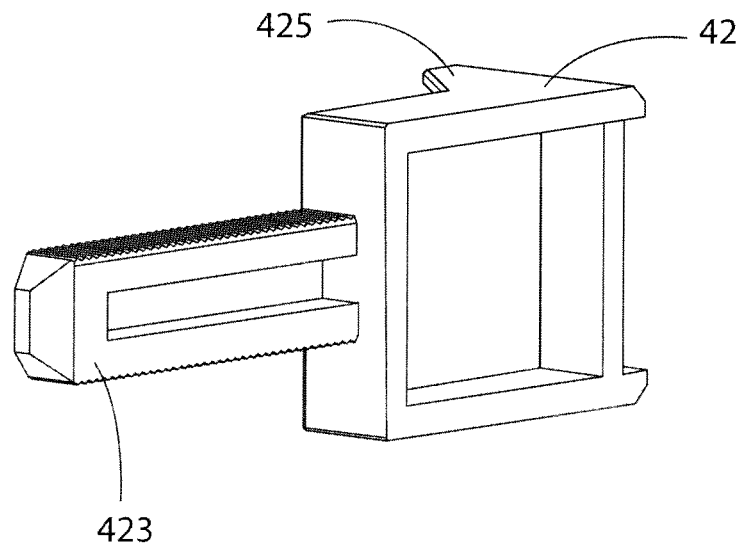
FIG. 10 shows a view of an adjusting portion of another exemplary adjusting block.
Figure 12:
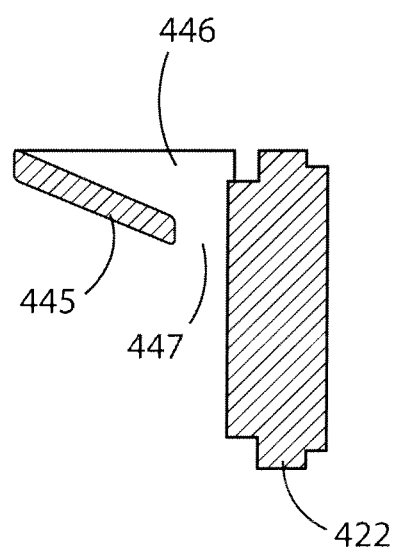
FIG. 12 shows a top view of the fixing portion shown in FIG. 11.
Figure 13:
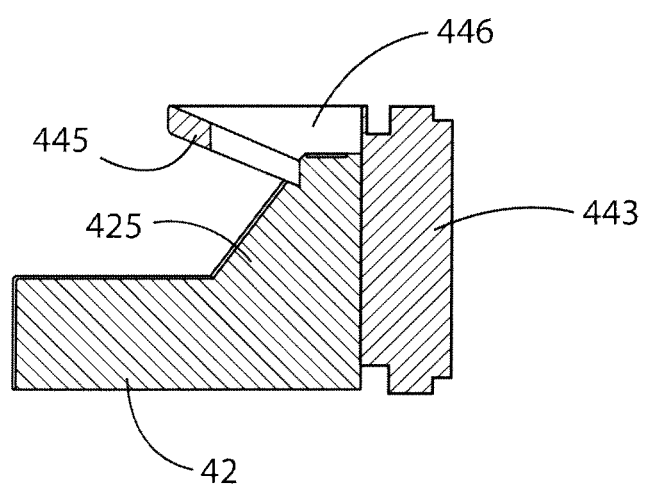
FIG. 13 shows a top view of the adjusting portion of another exemplary adjusting block as being coupled with the fixing portion.

The shower door assembly described in example 1 is substantially similar to the shower door assembly described in example 2 except the connection of the adjusting block 40 with the stationary frame 10. In this example, referring to FIGS. 10 to 12, the adjusting block 40 includes two dependent components, an adjusting portion 42 and a fixing portion 44. The adjusting portion 44 has an extension portion 423 and a baffle 425, and the fixing portion 44 has a base 443 and a lateral wall 441 projecting vertically from the base 443. Two elastic members, for example two elastic plates, are provided at upper and lower ends of one side of the lateral wall 441 remote from the base 443. Between the elastic member 445 and the base 443 is formed an open chamber 446 having an opening 447. When the elastic members 445 are pressed by the baffle 425 of the adjusting block 40, the elastic members 445 will be deformed such that the baffle 425 continuously approaches to the base 443 and consequently is squeezed into the chamber 446 through the opening 447. Subsequently the elastic members 445 come back to the original positions to act on the baffle 425 such that the fixing portion 44 and the adjusting portion 42 are coupled with each other (referring to FIG. 13).

Figure 11:
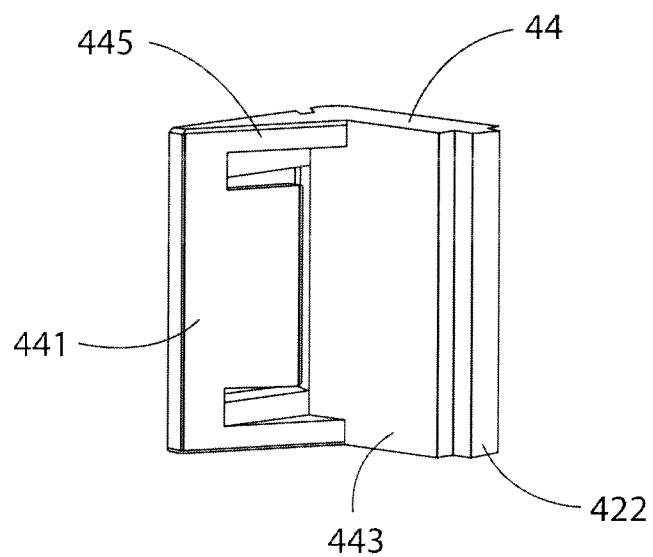
FIG. 11 shows a view of a fixing portion of the adjusting block shown in FIG. 10.

In this example, referring to FIG. 11, a flange 422 is provided on the base 443 of the fixing portion 44. The base 443 can be slidingly connected to the baffles 104a and 104b of the stationary frame 10 and the lateral wall 103 such that the fixing portion 44 is connected to the stationary frame 10.

During the installation process, the stationary frame 10 is fixed to the wall after the fixing portion 44 of the adjusting block 40 is installed to the stationary frame 10, and subsequently the movable frame 20, the fixing block 50 and the upper frame 30 are connected together and thus the extension portion 423 of the adjusting portion 44 of the adjusting block 40 is inserted into the passage 63 such that the handle 71 can be rotated to achieve a tight coupling of the adjusting portion 42 with the movable frame 20. The movable frame 20 is moved toward the stationary frame 10 to change the relative positions of the stationary frame 10 and the movable frame 20. The elastic members are pressed by the baffle 425 of the adjusting block 40 to make the elastic member deform such that the baffle 425 continuously approaches to the base 443 and consequently is squeezed into the chamber 446 through the opening 447. The elastic members 445 subsequently come back to the original positions to act on the baffle 425 such that the fixing portion 44 and the adjusting portion 42 are coupled with each other. The handle 71 can be rotated again to release the close state as required to adjust the relative positions of the stationary frame 10 and the movable frame 20. When the desired relative positions are acquired, the handle 71 is rotated downwards to achieve the close state.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A shower door assembly, comprising:
a stationary frame,
a movable frame having a window,
an upper frame, and
an adjusting assembly comprising
an adjusting block disposed between the stationary frame and the movable frame and at least partially received in the stationary frame, the adjusting block including an extension portion on a surface of which a first engaging element is disposed, and
a fixing block received in the upper frame and including an eccentric rotary block having a second engaging element and a base portion having a passage for receiving the extension portion, the eccentric rotary block being rotatable about the base portion,
wherein the eccentric rotary block comprises a push portion and a handle substantially perpendicular to the push portion, and the second engaging element is disposed on an outer surface of the push portion.

2. The shower door assembly of claim 1, wherein the upper frame has an opening where the fixing block is at least partially embedded.

3. The shower door assembly of claim 1, wherein the upper frame has a sliding groove and correspondingly the fixing block has a sliding rail, such that the fixing block can slide into the upper frame along the sliding groove and is received in the upper frame.

4. The shower door assembly of claim 1, wherein the second engaging element is disposed on a surface of the push portion adjacent to the handle.

5. The shower door assembly of claim 1, wherein a gap is formed at an end of the handle remote from the push portion.

6. The shower door assembly of claim 1, wherein the base portion includes a concave for receiving the eccentric rotary block.

7. The shower door assembly of claim 6, wherein a first pinhole is disposed on a wall of the concave and correspondingly a second pinhole is disposed on the push portion of the eccentric rotary block, the eccentric rotary block being rotatable about the base portion by a pin.

8. The shower door assembly of claim 1, wherein the stationary frame has a guiding groove and the adjusting block has a flange such that the adjusting block can be received in the stationary frame.

9. The shower door assembly of claim 1, wherein the adjusting block comprises an adjusting portion having the extension portion and a baffle, and a fixing portion having a base, a lateral wall projecting vertically from the base and an elastic member connected to the lateral wall, and an open chamber is formed between the elastic member and the base, wherein the baffle can be inserted into the chamber as the elastic member is pressed by the baffle such that the fixing portion and the adjusting portion are coupled with each other.

* * * * *